United States Patent
Creed et al.

(10) Patent No.: US 10,535,100 B1
(45) Date of Patent: Jan. 14, 2020

(54) METHOD, SYSTEM, AND APPARATUS FOR FACILITATING TRUST CERTIFICATE MANAGEMENT/EXCHANGE

(71) Applicant: Goldman, Sachs & Co., New York, NY (US)

(72) Inventors: Christopher John Creed, New York, NY (US); David Jonathan Rosenblum, Purchase, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 654 days.

(21) Appl. No.: 14/324,444

(22) Filed: Jul. 7, 2014

Related U.S. Application Data

(63) Continuation of application No. 11/682,854, filed on Mar. 6, 2007, now Pat. No. 8,775,285.

(60) Provisional application No. 60/779,895, filed on Mar. 6, 2006.

(51) Int. Cl.
  *G06Q 40/00* (2012.01)
  *G06Q 40/06* (2012.01)
  *G06Q 40/02* (2012.01)
  *G06Q 40/04* (2012.01)

(52) U.S. Cl.
  CPC .......... *G06Q 40/06* (2013.01); *G06Q 40/025* (2013.01); *G06Q 40/04* (2013.01)

(58) Field of Classification Search
  CPC ......... G06Q 40/00; G06Q 40/04; G06Q 40/06
  See application file for complete search history.

(56) References Cited

U.S. PATENT DOCUMENTS

| | | | |
|---|---|---|---|
| 5,802,499 A * | 9/1998 | Sampson et al. | 705/35 |
| 6,192,347 B1 * | 2/2001 | Graff | G06Q 30/06 705/31 |
| 6,411,939 B1 * | 6/2002 | Parsons | 705/35 |
| 6,513,020 B1 * | 1/2003 | Weiss | G06Q 40/06 705/35 |
| 7,398,243 B1 * | 7/2008 | Ocampo | G06Q 40/06 705/36 R |
| 2002/0046154 A1 * | 4/2002 | Pritchard | 705/37 |
| 2004/0267932 A1 * | 12/2004 | Voellm | G06F 9/5011 709/226 |

(Continued)

OTHER PUBLICATIONS

Benefits for an Older Workforce Olivia S. Mitchell; 18 pages (Year: 2004).*

*Primary Examiner* — Eric T Wong
*Assistant Examiner* — Mary M Gregg

(57) ABSTRACT

The disclosure details implementations of apparatuses, methods, and systems directed to facilitating an entity sponsoring a trust. The sponsoring entity contributes a pool of assets (e.g., a pool of real property mortgages) to fund the trust. The system facilitates the creation of one or more classes of certificates that represent a portion of the assets held in the trust. For example, if the trust is funded by mortgages, the certificates will represent rights to different portions of principal and/or interest payments generated by the mortgages held as the asset pool. The sponsoring entity can use the system to sell all or some of the certificates to unrelated parties and to create a market in the certificates. Further, in an implementation, the sponsoring entity may also use the system to facilitate an ongoing certificate exchange program implementing a series of certificate exchange applications.

21 Claims, 9 Drawing Sheets

(56) References Cited

U.S. PATENT DOCUMENTS

| | | | | |
|---|---|---|---|---|
| 2005/0216399 A1* | 9/2005 | Colvin | ............... | G06Q 20/10 |
| | | | | 705/39 |
| 2005/0234816 A1* | 10/2005 | Hendrix | ............. | G06Q 20/10 |
| | | | | 705/39 |
| 2006/0173763 A1* | 8/2006 | O'Connor | .......... | G06Q 40/00 |
| | | | | 705/35 |
| 2006/0282356 A1* | 12/2006 | Andres | ............. | G06Q 40/04 |
| | | | | 705/35 |

* cited by examiner

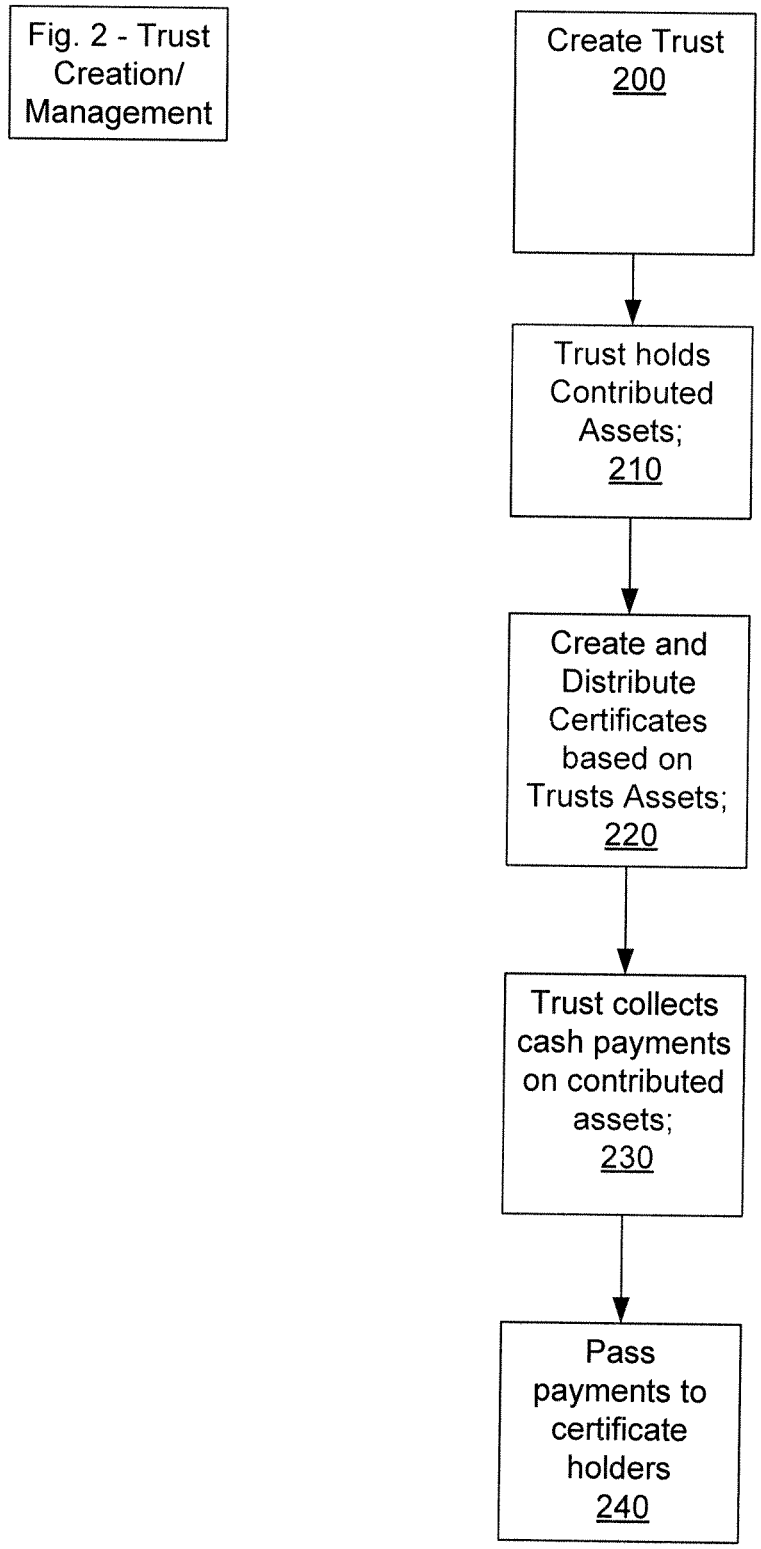

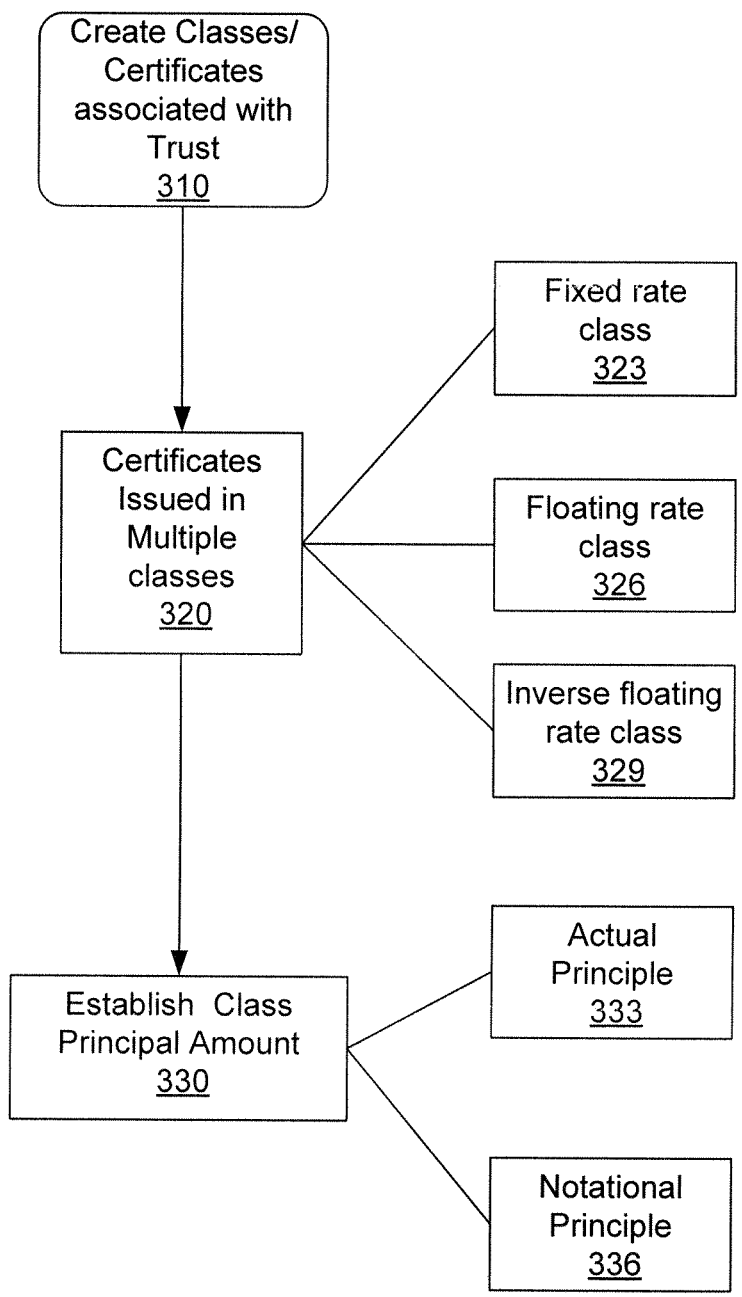
Fig. 3A - Class/Certificate Creation

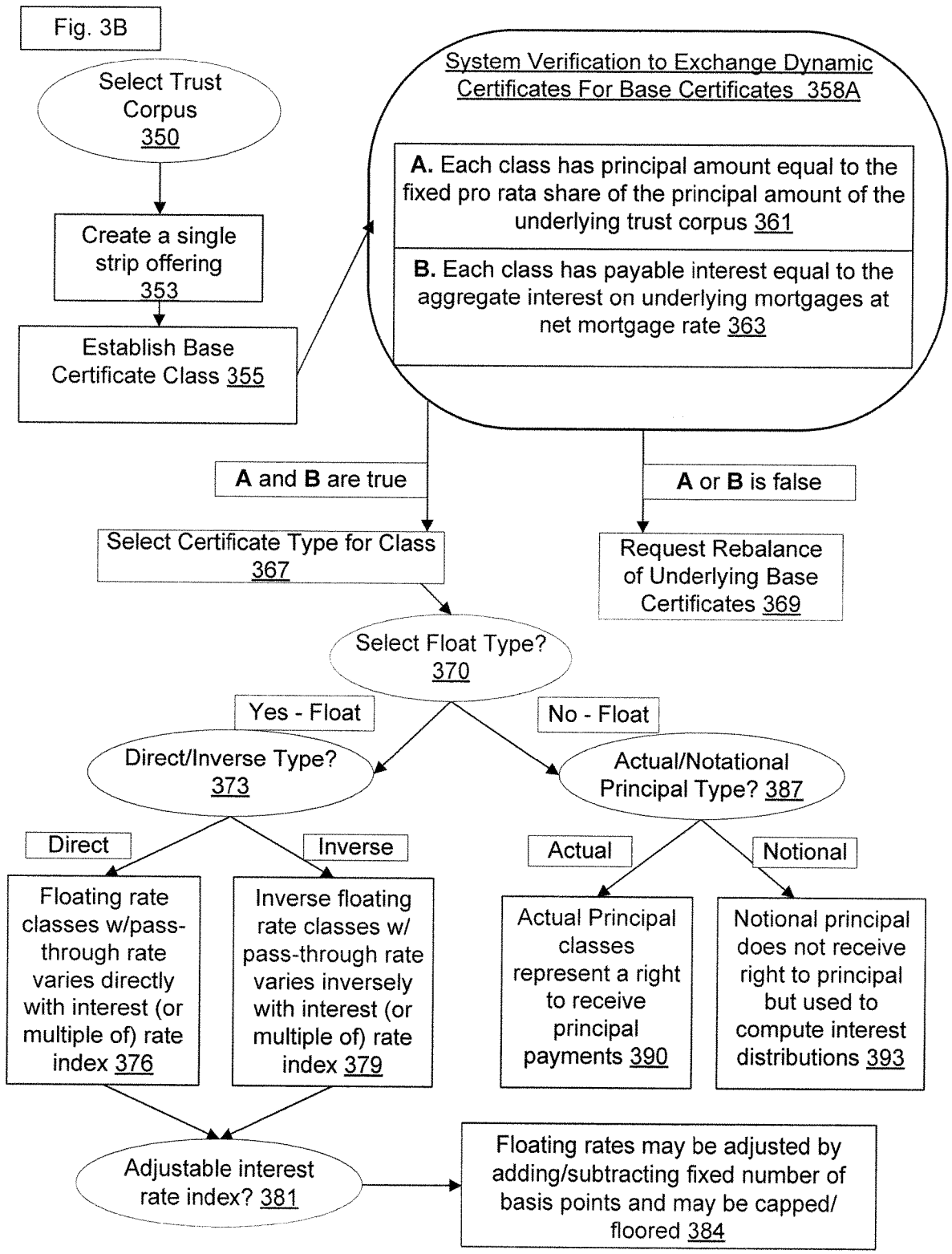

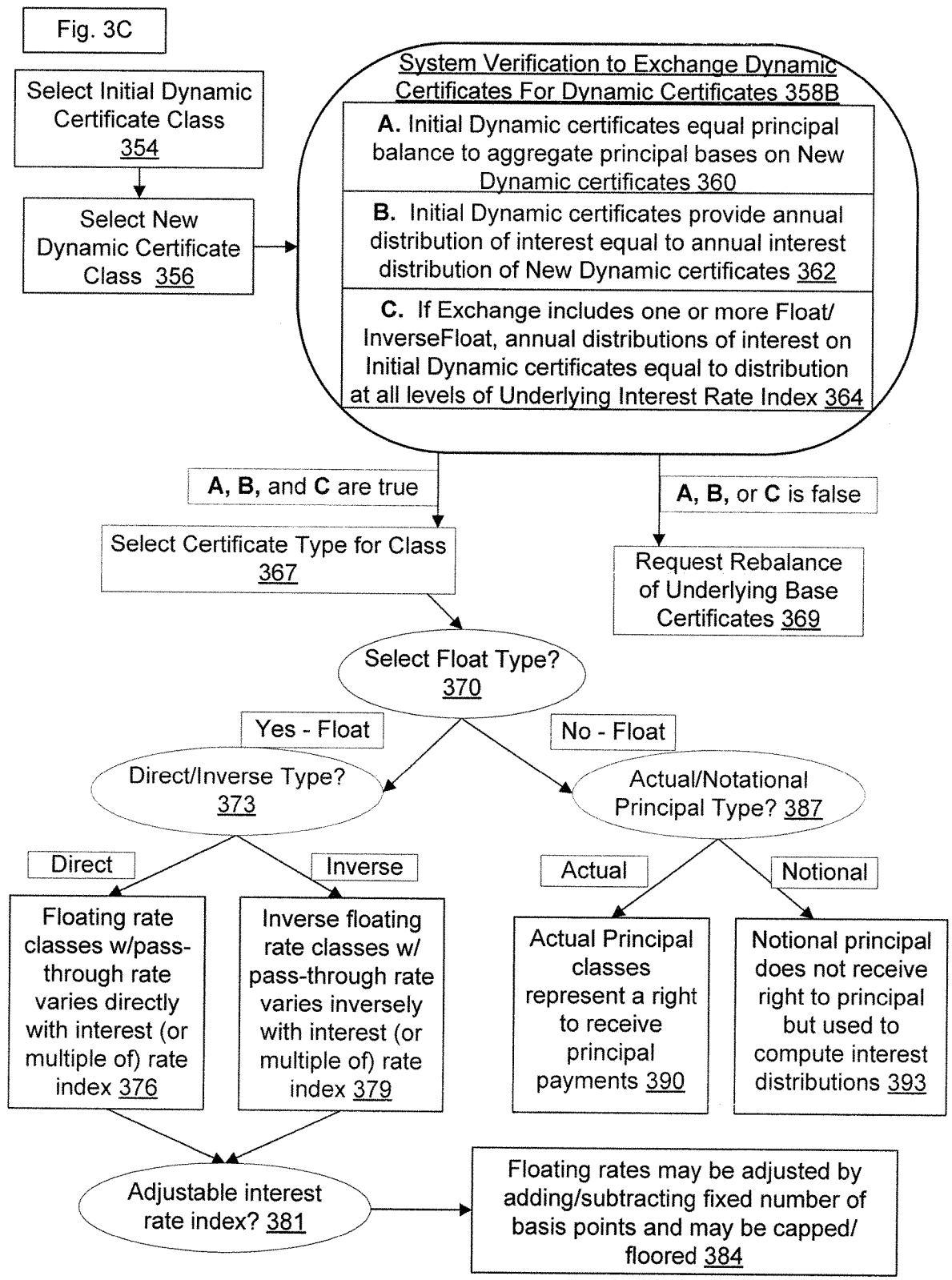

Fig. 3D

| Class | Delay | Floor | Cap | Margin | Multiplier | Index | Floater Formula |
|---|---|---|---|---|---|---|---|
| 65F20 | 0 | 0.2000 | 6.5000 | 0.2000 | 1.0000 | 1month LIBOR | LIBOR_1MO + 0.2 |
| 65S20 | 0 | - | 6.3000 | 6.3000 | (1.0000) | 1month LIBOR | 6.3 - LIBOR_1MO |
| 65F25 | 0 | 0.2500 | 6.5000 | 0.2500 | 1.0000 | 1month LIBOR | LIBOR_1MO + 0.25 |
| 65S25 | 0 | - | 6.2500 | 6.2500 | (1.0000) | 1month LIBOR | 6.25 - LIBOR_1MO |
| 65F30 | 0 | 0.3000 | 6.5000 | 0.3000 | 1.0000 | 1month LIBOR | LIBOR_1MO + 0.3 |
| 65S30 | 0 | - | 6.2000 | 6.2000 | (1.0000) | 1month LIBOR | 6.2 - LIBOR_1MO |
| 65F35 | 0 | 0.3500 | 6.5000 | 0.3500 | 1.0000 | 1month LIBOR | LIBOR_1MO + 0.35 |
| 65S35 | 0 | - | 6.1500 | 6.1500 | (1.0000) | 1month LIBOR | 6.15 - LIBOR_1MO |
| 65F40 | 0 | 0.4000 | 6.5000 | 0.4000 | 1.0000 | 1month LIBOR | LIBOR_1MO + 0.4 |
| 65S40 | 0 | - | 6.1000 | 6.1000 | (1.0000) | 1month LIBOR | 6.1 - LIBOR_1MO |
| 65F45 | 0 | 0.4500 | 6.5000 | 0.4500 | 1.0000 | 1month LIBOR | LIBOR_1MO + 0.45 |
| 65S45 | 0 | - | 6.0500 | 6.0500 | (1.0000) | 1month LIBOR | 6.05 - LIBOR_1MO |
| 65F50 | 0 | 0.5000 | 6.5000 | 0.5000 | 1.0000 | 1month LIBOR | LIBOR_1MO + 0.5 |
| 65S50 | 0 | - | 6.0000 | 6.0000 | (1.0000) | 1month LIBOR | 6 - LIBOR_1MO |
| 65F55 | 0 | 0.5500 | 6.5000 | 0.5500 | 1.0000 | 1month LIBOR | LIBOR_1MO + 0.55 |
| 65S55 | 0 | - | 5.9500 | 5.9500 | (1.0000) | 1month LIBOR | 5.95 - LIBOR_1MO |
| 65F60 | 0 | 0.6000 | 6.5000 | 0.6000 | 1.0000 | 1month LIBOR | LIBOR_1MO + 0.6 |
| 65S60 | 0 | - | 5.9000 | 5.9000 | (1.0000) | 1month LIBOR | 5.9 - LIBOR_1MO |
| 7F20 | 0 | 0.2000 | 7.0000 | 0.2000 | 1.0000 | 1month LIBOR | LIBOR_1MO + 0.2 |
| 7S20 | 0 | - | 6.8000 | 6.8000 | (1.0000) | 1month LIBOR | 6.8 - LIBOR_1MO |
| 7F25 | 0 | 0.2500 | 7.0000 | 0.2500 | 1.0000 | 1month LIBOR | LIBOR_1MO + 0.25 |
| 7S25 | 0 | - | 6.7500 | 6.7500 | (1.0000) | 1month LIBOR | 6.75 - LIBOR_1MO |
| 7F30 | 0 | 0.3000 | 7.0000 | 0.3000 | 1.0000 | 1month LIBOR | LIBOR_1MO + 0.3 |
| 7S30 | 0 | - | 6.7000 | 6.7000 | (1.0000) | 1month LIBOR | 6.7 - LIBOR_1MO |
| 7F35 | 0 | 0.3500 | 7.0000 | 0.3500 | 1.0000 | 1month LIBOR | LIBOR_1MO + 0.35 |
| 7S35 | 0 | - | 6.6500 | 6.6500 | (1.0000) | 1month LIBOR | 6.65 - LIBOR_1MO |
| 7F40 | 0 | 0.4000 | 7.0000 | 0.4000 | 1.0000 | 1month LIBOR | LIBOR_1MO + 0.4 |
| 7S40 | 0 | - | 6.6000 | 6.6000 | (1.0000) | 1month LIBOR | 6.6 - LIBOR_1MO |
| 7F45 | 0 | 0.4500 | 7.0000 | 0.4500 | 1.0000 | 1month LIBOR | LIBOR_1MO + 0.45 |
| 7S45 | 0 | - | 6.5500 | 6.5500 | (1.0000) | 1month LIBOR | 6.55 - LIBOR_1MO |
| 7F50 | 0 | 0.5000 | 7.0000 | 0.5000 | 1.0000 | 1month LIBOR | LIBOR_1MO + 0.5 |
| 7S50 | 0 | - | 6.5000 | 6.5000 | (1.0000) | 1month LIBOR | 6.5 - LIBOR_1MO |
| 7F55 | 0 | 0.5500 | 7.0000 | 0.5500 | 1.0000 | 1month LIBOR | LIBOR_1MO + 0.55 |

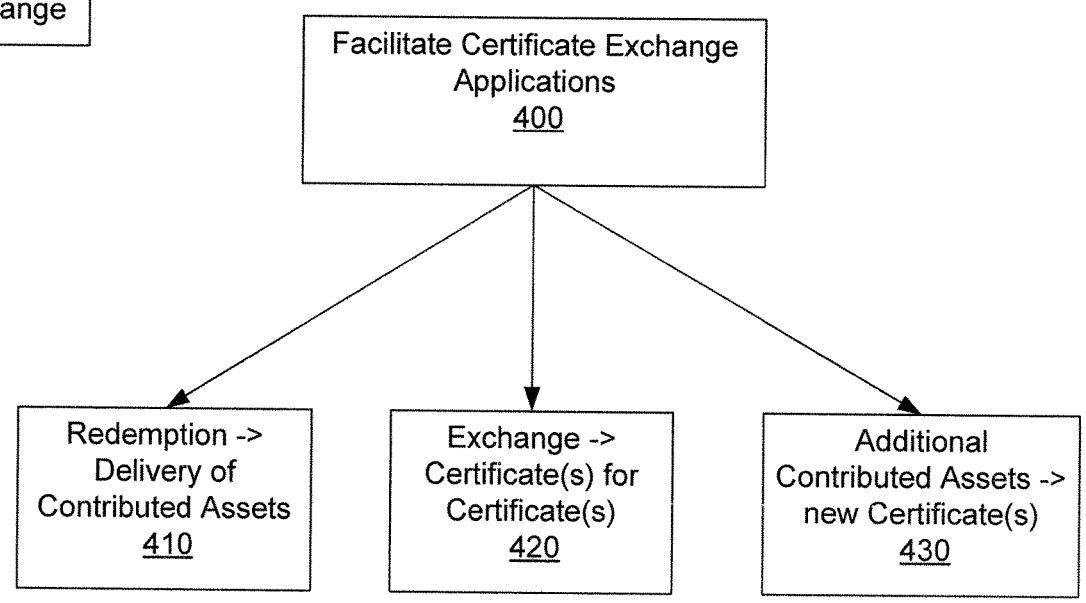

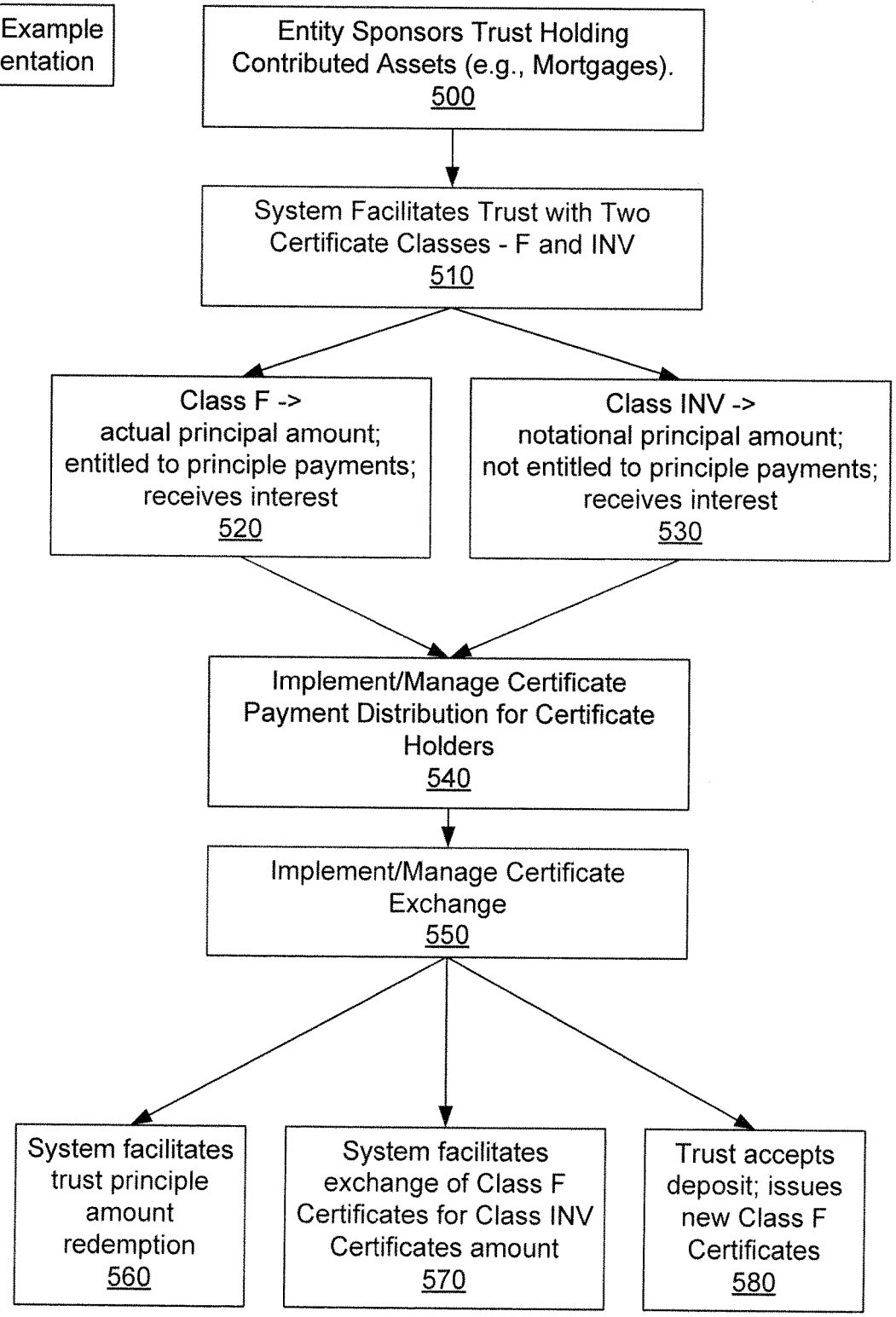

US 10,535,100 B1

METHOD, SYSTEM, AND APPARATUS FOR FACILITATING TRUST CERTIFICATE MANAGEMENT/EXCHANGE

CLAIM FOR PRIORITY

This application is a continuation of U.S. patent application Ser. No. 11/682,854 entitled "Method, System, And Apparatus For Facilitating Trust Certificate Management/Exchange," filed Mar. 6, 2007, which claims priority under 35 U.S.C. 119(e) to U.S. Provisional Application Ser. No. 60/779,895, filed on Mar. 6, 2006, titled, "Method, System, and Apparatus for Facilitating Trust Certificate Management/Exchange", the contents of which are hereby incorporated by reference herein in their entirety for all purposes.

FIELD OF THE INVENTION

The present invention is directed generally to apparatuses, methods, and systems for creating, managing, and exchanging financial instruments. More particularly, according to an implementation, the disclosure discusses an apparatus, method and system that facilitates an entity sponsoring a trust based on certain underlying assets, as well as creating, distributing, and facilitating exchange of classes of certificates that represent different types of interests in the trust.

BACKGROUND OF THE INVENTION

Computerized marketplaces of all kinds range from simple classified ad bulletin boards to complex mainframe-based market systems such as NASDAQ, which offers a real-time market-making system for tens of thousands of securities brokers. These marketplace systems centralize interactions between its constituent providers and seekers of assets, goods, opportunities and services. All modern stock, bond and commodity exchanges are supported by underlying computerized databases and related systems, which enable them to function.

Trading systems for items having substantial value generally are an automated version of a manual trading process. For example, securities trading systems are based on a model wherein a customer contacts a so-called retail broker to place an order. The broker, in turn, submits the order to a dealer who executes the order and returns an order confirmation to the broker. Other known systems automate the open outcry process used in trading pits. Importantly, securities trading is heavily regulated. Many of the terms and conditions prevalent in securities trades are limited by convention and regulation. Automated securities trading systems necessarily reflect these constraints. Such financial systems typically rely on underlying information technology systems, user interfaces, networks, and/or other core technologies.

As such, current systems allow for the trade of asset interests through various forms of financial instruments.

SUMMARY

The disclosure details implementations of apparatuses, methods, and systems directed to facilitating an entity sponsoring a trust. The sponsoring entity contributes a pool of assets (e.g., a pool of real property mortgages) to fund a grantor trust. The system facilitates the creation of one or more classes of certificates that represent an interest in a portion of the assets held in the trust.

At a given point in time, different investors may be willing to pay more in the aggregate for partial interests in assets (e.g., mortgages) representing rights to different portions of interest and principal payments (stripped interests) than for the mortgages as a whole. There are significant obstacles that have limited generating/distributing/exchanging interest strips as either strips associated with a fixed number of basis points of interest or strips associated with a fixed percentage of all interest. The disclosed implementations directed to facilitating an entity sponsoring trust overcome such obstacles.

For example, if the trust is funded by mortgages, the certificates will represent rights to different portions of principal and/or interest payments generated by the mortgages held as the asset pool. The sponsoring entity can use the system to generate a variety of classes of certificates and distribute all or some of the certificates. In an implementation, the sponsoring entity may also use the system to facilitate an ongoing certificate exchange program implementing a series of certificate exchange applications.

BRIEF DESCRIPTION OF THE DRAWINGS

The accompanying drawings illustrate various non-limiting, example, inventive aspects in accordance with the present disclosure:

FIG. 2 of the present disclosure illustrates high-level aspects of trust creation and system user interaction;

FIGS. 3A-3D of the present disclosure illustrate aspects associated with establishing/exchanging classes of certificates based on assets associated with an underlying grantor trust;

FIG. 4 of the present disclosure illustrates aspects of the trust certification exchange processes according to an embodiment of the invention;

FIG. 5 illustrates an implementation of the system that facilitates trust creation, as well as certificate creation, distribution, and exchange.

The leading number of each reference number within the drawings indicates the figure in which that reference number is introduced and/or detailed. As such, reference number 101 is first introduced in FIG. 1. Reference number 201 is introduced in FIG. 2, etc.

DETAILED DESCRIPTION

Figure 1:
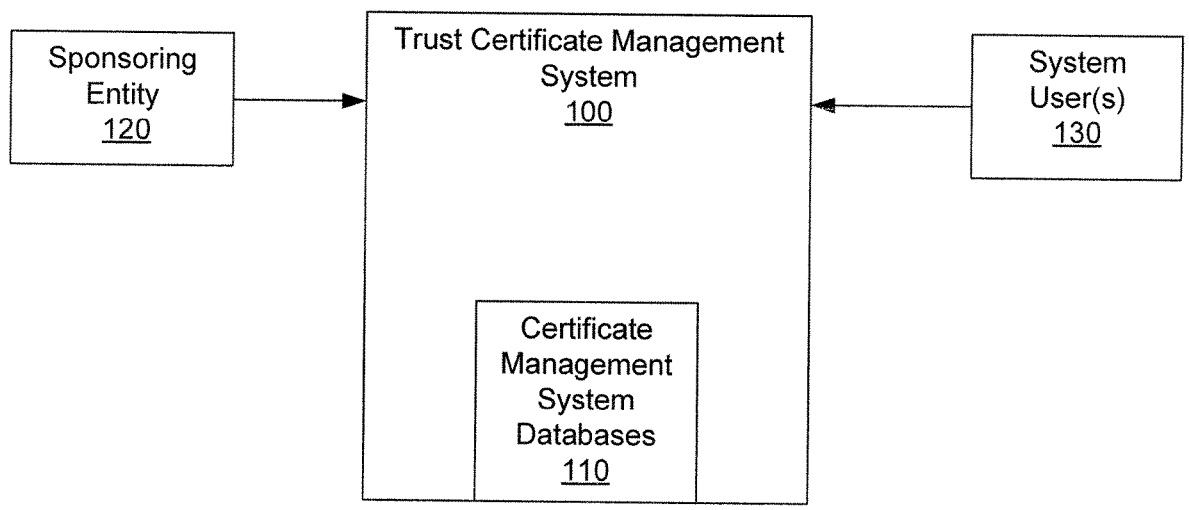
FIG. 1 of the present disclosure is a high-level diagram illustrating the entities that interact with the system according to an embodiment of the invention.

FIG. 1 illustrates a high-level diagram of the entities that interact with the system according to an implementation of the system. By way of example only, this implementation includes a trust certificate management system (TCMS) 100, as well as corresponding TCMS system databases 110. The sponsoring entity 120 interacts with the system to coordinate the creation and funding of a trust (or select a previously created trust). Once the trust is created, the sponsoring entity uses the system to create a series of certificate classes that represent interests that are associated with portions of the trust assets. The sponsor entity may create a number of certificates that are associated with each class and may sell the certificates to one or more unrelated system users 130 (e.g., investors). For example, according to one implementation of the system, the system facilitates issuing variable rate notes based on assets held by a Grantor Trust. In that implementation, the variable coupons would qualify as "stripped coupons" or "Stripped bonds" within the meaning of Section 1286.

By acquiring a certificate, the system user 130 is then entitled to a portion of the revenue generated by the trust. For example, in an implementation involving funding the trust with real property mortgages, a certificate holder may be entitled to a portion of the principal or interest earned on the mortgages depending on how the underlying certificate class is structured. It is to be understood that the trust may be funded by any of a number of financial instruments that generate some time of cash flow/revenue stream such as licensing royalties, student loans, credit card debt, aircraft leases, etc . . . .

FIG. 2 illustrates a flow diagram illustrating trust creation 200. An entity sponsors the initial trust creation, which involves funding the trust with contributed assets 210. However, it is to be understood that that sponsor entity may proceed with generating certificate classes based on a pre-existing trust. For the purposes of illustration, the instant disclosure discusses the system in the context of a trust that is funded with real property mortgages. However, it is to be understood that the sponsor could create certificate classes based on a trusts funded by a wide variety of financial instruments and/or assets.

Next 220, the sponsoring entity coordinates creation and distribution of certificates based on the trusts assets (the creation/exchange process is described in greater detail in FIGS. 3A-3D.) In the mortgage trust implementation, the trust collects revenue in the form of cash payments collected based on the underlying mortgages 230, which in turn are distributed to the certificate holders 240 in accordance with the particular characteristics of the holders' certificates.

According to an implementation of the system, the terms used herein comply with US Government Laws/Regulations for: REMIC rules: Sections 860A through A60G; Taxation on Stripped Coupons: Section 1286; "Grantor Trusts" can be defined the "Certain investment trust" defined in 301.7701-4(c); Specified Portion of Interest Payments: 1.860G-1(a)(2); and the term Variable Rate as defined in 1.860G-1(a)(3), referencing 1.1275-5(b)(1) and 1.1275-5(a)(4). However, it is to be understood that the system provides significant flexibility and may be configured in accordance with any number of instruments and any corresponding instrument characteristics. Accordingly, the system may be adapted to conform to future changes to these and other governmental laws or regulations that directly or indirectly relate to creating an underlying trust and creating/managing/exchanging dynamic certificates based on the assets held by the trust.

FIGS. 3A-3D illustrate aspects of one embodiment of the system that relates to certificate class creation/exchange. It is to be understood that the system may coordinate creation of a variety of certificate classes with a broad range characteristics. Examples of configuration classes may be seen in FIG. 3D. In one implementation, the system can create and coordinate a series of the classes of certificates that are all derived from the same trust, as in 310. For example, certificate classes may be structured based on a return interest rate or underlying principal payments associated with the mortgages. Some examples of structured certificates include a fixed rate class 323, a floating rate class 326, or an inverse floating rate class 329. Additional examples of the certificates include certificates that are based on actual principal 333 or on notational principal 336. Upon issuance of certificate classes 320, the system establishes a class principal amount 330.

FIG. 3B illustrates aspects of the process associated with a sponsor establishing several classes of certificates, as well as a system user (certificate holder) requesting an exchange of base certificates for dynamic certificates. The process in FIG. 3B starts with the sponsor using the system to select the underlying trust corpus 350. This trust corpus provides the assets for the creation of the base certificate classes (e.g., interest only, principle only, etc. . . . ) 353, 355. Subsequently, a system user can interface with the system to exchange base certificates for dynamic certificates (e.g., floating, inverse floating, etc. . . . ) provided that two requirements 358A are verified:

A. Each certificate class (base/dynamic) has a principal amount equal to the fixed pro rata share of the principal amount of the underlying trust corpus 361; and B. Each certificate class (base/dynamic) has payable interest equal to the aggregate interest on underlying mortgages in the trust at a net mortgage rate 363.

In one embodiment, a deterministic optimization model is used to constrain values such that they satisfy both of the above requirements. Once these two requirements are met, the system user can move to the dynamic certificate class selection process 367. If the both requirements are not met, the system may be configured to request a certificate rebalancing 369. The system allows one to issue as many classes as desired as long as specified portion requirements are met and provided that such classes are made at the time of trust creation.

Examples of possible class type implementations will be described in greater detail below with regard to FIG. 5D.

In the implementation illustrated in FIG. 3B, the system user selects whether the dynamic certificate class will be a floating interest based certificate 370. If the sponsor selects a floating structured certificate, the system then inquires whether the float is structured as a direct float 376 or an inverse float certificate 379. The main distinction between a direct/indirect float type is related to the underlying base interest rate (e.g., LIBOR). It is to be understood that the float type may be based on any number of variable rates. In an implementation dynamic certificates structured as floating rate instruments may be configured with a variable rate which conforms to the Specified Portion rules. For example, variable rates may include, and in each case, in all of its tennors (1 mo, 3 mo, 6 mo, 1 yr, 2 yr, . . . 30 yr, etc.): LIBOR, CMT, CMS, COFI (11th District, e.g.); FedFunds, MTA, EURIBOR, PRIME, a Certificate of Deposit, a Fannie Mae Required Rate, and/or a Freddie Mac Required Rate.

A direct floating rate certificate classes is based on a pass-through rate that varies directly with an underlying interest rate (or a multiple of the rate index) 376. In contrast, an inverse floating rate certificate classes implement a pass-through rate that varies inversely with the underlying interest rate (or a multiple of the rate index) 379.

In some implementations, the system user may use the system to request dynamic certificate classes with adjusted underlying interest rate indexes 381. The float certificate classes may be further customized by adding or subtracting basis points from the underlying interest rate (e.g., LIBOR+0.2%) 384. Further still, in additional implementations, the float certificate class may incorporate an interest rate floor or ceiling (e.g., LIBOR or LIBOR+0.25% with a max of 10% return) 384.

If the system user requests a certificate class without a float 370, then the system moves to a principal based (and/or fixed rate) certificate structure 387. Depending on the desired type of certificate, the system will select whether the principle based certificate structure will be actual 390 or notional 393. Actual principal certificate classes represent a certificate holder's right to receive the actual principal payments. In the mortgage grantor trust example, this would involve a portion of the actual payments on the mortgages used to fund the grantor trust. Alternately, the sponsor can use the system to create notional principal certificate class, wherein the certificate holder's right does not involve the right to receive actual principle. Instead, principal payments on the underlying mortgages are used to compute interest distributions 393.

FIG. 3C illustrates an example of an implementation with a system user exchanging dynamic certificates for dynamic certificates. In this scenario, the system user selects the initial dynamic certificates they wish to exchange 354. The system user selects a new dynamic certificate class 356. When exchanging an initial dynamic certificate for new dynamic certificates, the system employs three constraints to facilitate such an exchange 358B.

A. The initial dynamic certificates principal balance must equal to the aggregate principal of the new dynamic certificates 360;

B. The initial dynamic certificates must provide an annual distribution of interest equal to the annual interest distribution of new dynamic certificates 362; and C. If the exchange includes one or more Float/Inverse Float certificate types, the annual distributions of interest on the initial dynamic certificates must be equal to the annual distributions of interest for the underlying float certificate interest rate index 364.

If these three requirements are met, the system user can proceed with selecting the certificate type for the class 367 and proceed accordingly 373, 376, 379, 381 and 384 in the provision of the desired new dynamic certificates. If the three requirements are not met, the system may be configured to request a certificate rebalancing 369 such that the requirements 358B are met.

As discussed above, a variety of dynamic certificate classes 394 are possible; FIG. 3D includes a listing of various examples of certificate classes 396 each with a unique flavor of risk/reward characteristics. For example, class 65F20 has certificates characteristics that are based on a interest rate index 397 (e.g., 1 month LIBOR) and an adjusted float return that is LIBOR+0.2% as element 398 illustrates. The system has structured the certificates that comprise class F1 with both a floor and a ceiling float rate 399. Accordingly, even if the LIBOR increases beyond 6.5%, the certificate holder's return will not exceed 6.5%. Similarly, the certificate holder's return will not drop below 0.2%. Once the certificate classes are generated and the certificates distributed, the system may also be used by a sponsor to coordinate various certificate exchange applications.

As illustrated in FIG. 4, in some implementations, the system may be used to facilitate a variety of certificate exchange applications 400. For example, one type of exchange application relates to a certificate redemption application 410. In the redemption application, a certificate holder may have the right to deliver the certificate to the sponsoring entity and receive a portion of the contributed assets that fund the trust in exchange. A second application involves subsequent certificate exchange 420. The system may be configured to execute a certificate valuation application and enable a holder of one class of certificates to exchange them for an equivalent value of a different class of certificates. A third application involves new certificate generation 430. For example, the system may be configured to identify when a system user contributes assets to the trust. In exchange for the contribution, the system user may be provided with a certain number of new certificates. These applications may use the system as described in FIGS. 1-3 as a basis for certificate exchange.

FIG. 5 illustrates a flow diagram associated with an example system implementation. Initially, a sponsoring entity contributes assets (e.g., mortgages) in order to create a trust 500. The sponsoring entity then coordinates the creation of two types of certificate classes—Class F and Class INV 510. By way of example only, Class F (floating rate certificates) is a class of certificates configured with actual principal amounts in aggregate that are equal to the principal amount of the mortgages 520. Floating rate certificates entitle the holder to a pro rata share (based on the portion of the class represented by the certificate) of the principal payments on the mortgages received by the sponsoring entity, and a pro rata share of a portion of the interest payments on the mortgages received by the sponsoring entity.

Another class, class INV (inverse floating rate certificates) may be configured with a notational principal amount, used in computing interest payments, equal in the aggregate to the principal amount of the mortgages, but will not be entitled to receive any actual principal payments 530. Each inverse floating rate certificate will entitle the holder to a pro rata share (based on the portion of the class represented by the certificate) of a share of the interest payments on the mortgages received by the sponsoring entity. Accordingly, the system may be configured to facilitate payment of the certificate holders 540.

As described above, the system may be configured to implement certificate exchange applications 550 (e.g., see FIG. 4). For example, a certificate holder may deliver to the sponsoring entity for cancellation certificates and receive mortgages in exchange 560. In another exchange application, the certificate holders of class F certificates may use the system to shift all or a portion of the holdings into class INV certificates 570. Alternately, a system user may contribute additional assets to the trust and in return the system would generate additional certificates 580. The new certificates would be issued to the contributing system holder according to their specifications (i.e., a contributing system user may request class F certificates). However, it is to be understood the applications and certificate classes discussed herein are provided as non-limiting examples. The system may be configured to facilitate a broad range of exchange applications and/or a broad range of certificate classes with various characteristics.

Trust Certificate Management System Controller

Figure 6:
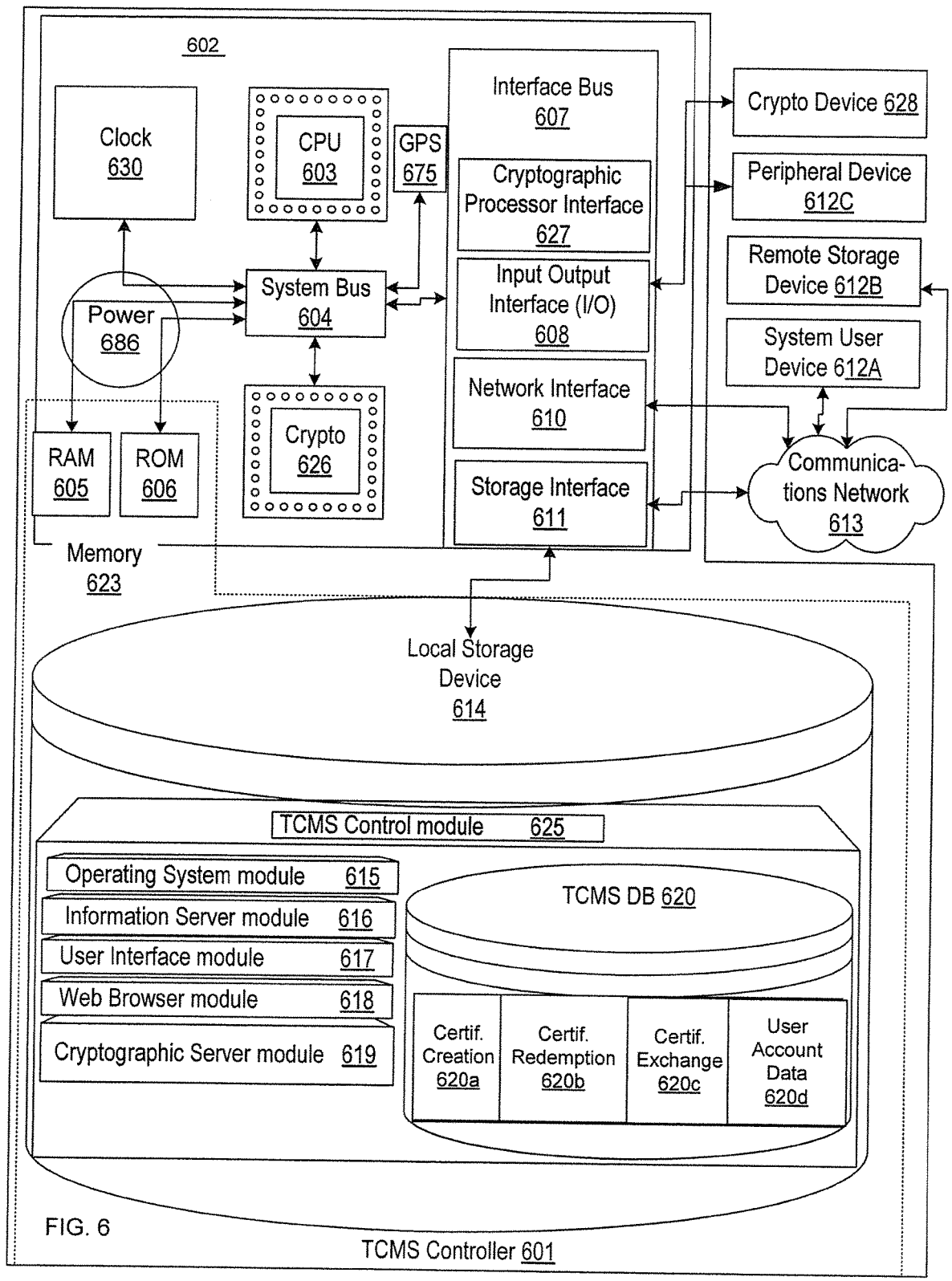
FIG. 6 illustrates software module/hardware components of a trust certificate management system (TCMS) controller in a block diagram, according to an implementation of the system.

FIG. 6 of the present disclosure illustrates inventive aspects of a trust certificate management system (TCMS) controller 601 in a block diagram. In this embodiment, the TCMS controller 601 may serve to process, store, search, serve, identify, instruct, generate, match, and/or update job postings, job applications, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the TCMS controller 601 may be connected to and/or communicate with entities such as, but not limited to: one or more users from user input devices 612A; peripheral devices 612C; a cryptographic processor device 628; and/or a communications network 613.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The TCMS controller 601 may be based on common computer systems that may comprise, but are not limited to, components such as: a computer systemization 602 connected to memory 623.

Computer Systemization

A computer systemization may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. Optionally, a global positioning system (GPS) 675 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the trust certificate management system controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the trust certificate management system thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 611, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 611 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the trust certificate management system controller is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 612A, peripheral devices 612C, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device 612C is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 612A may be card readers, dongles, finger print readers, gloves, graphics tablets, joysticks, keyboards, mouse (mice), remote controls, retina readers, trackballs, trackpads, and/or the like.

Peripheral devices 612C may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the trust certificate management system controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the trust certificate management system controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 623. However, memory is a fungible technology and resource, thus, any number of memory embodiments may be employed in lieu of or in concert with one another. It is to be understood that the trust certificate management system controller and/or a computer systemization may employ various forms of memory 623. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 623 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (CD-R), ReWritable (RW), DVD R/RW, etc.); and/or other devices of the like. Thus, a computer systemization generally requires and makes use of memory.

Module Collection

The memory 623 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 620; cryptographic server module(s) 619 (cryptographic server); the trust certificate management system control module(s) 625; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities 612B through a communications network, ROM, various forms of memory, and/or the like.

Operating System

The operating system module 615 is executable program code facilitating the operation of the trust certificate management system controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the trust certificate management system controller to communicate with other entities through a communications network 613. Various communication protocols may be used by trust certificate management system controller as a sub-carrier transport mechanism for interaction, such as, but not limited to: multicast, TCP/IP, UDP, unicast, and/or the like.

Information Server

An information server module 616 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the trust certificate management system controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the trust certificate management system database 620 operating systems, other program modules, user interfaces, Web browsers, and/or the like.

Access to the trust certificate management system database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the trust certificate management system. In one embodiment, the information server would provide a Web form accessible by a Web browser. Entries made into supplied fields in the Web form are tagged as having been entered into the particular fields, and parsed as such.

The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the trust certificate management system as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, strollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128-bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the trust certificate management system enabled nodes. The combined application may be nugatory on systems employing standard Web browsers.

Cryptographic Server

A cryptographic server module 619 is stored program code that is executed by the CPU 603, cryptographic processor 626, cryptographic processor interface 627, cryptographic processor device 628, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the trust certificate management system may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the trust certificate management system module to engage in secure transactions if so desired. The cryptographic module facilitates the secure accessing of resources on the trust certificate management system and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Trust Certificate Management System Database

The trust certificate management system database module 620 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the trust certificate management system database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the trust certificate management system database is implemented as a data-structure, the use of the trust certificate management system database 619 may be integrated into another module such as the trust certificate management system module 625. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the TCMS database module 620 includes several tables 620*a-d*. A certificate creation table 620*a* includes fields related to aspects of the system associated with creating and managing characteristics associated with the certificate classes. A certificate redemption table 620*b* includes data related to processing aspects of the system associated with certificate redemption—creating and distributing new certificates to a system use in exchange for additional contributed assets and/or canceling outstanding certificates and providing a user with an equivalent value of previously contributed assets. A certificate exchange table 620*c* includes data related to the exchange of a particular class/type of certificate(s) in exchange for a corresponding value of another class/type of certificate(s). A user account table 620*d* includes data related managing the accounts and holdings of system users.

In one embodiment, user programs may contain various user interface primitives, which may serve to update the trust certificate management system. Also, various accounts may require custom database tables depending upon the environments and the types of clients the trust certificate management system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 620*a-d*. The trust certificate management system may be configured to keep track of various settings, inputs, and parameters via database controllers.

The trust certificate management system database may communicate to and/or with other modules in a module collection, including itself, and/or facilities of the like. Most frequently, the trust certificate management system database communicates with the trust certificate management system control module, other program modules, and/or the like. The database may contain, retain, and provide information regarding other nodes and data.

The Trust Certificate Management System

The trust certificate management system control module 625 is stored program code that is executed by the CPU. The trust certificate management system affects accessing, obtaining and the provision of information, services, transactions, and/or the like across various communications networks. The trust certificate management system control module 625 facilitates the processing/modeling/analysis associated with the TCMS.

The trust certificate management system control module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/ or the like. In one embodiment, the trust certificate management system server employs a cryptographic server to encrypt and decrypt communications. The trust certificate management system module may communicate to and/or with other modules in a module collection, including itself, and/or facilities of the like. Most frequently, the trust certificate management system module communicates with the trust certificate management system database, operating systems, other program modules, and/or the like. The trust certificate management system may contain, communicate, generate, obtain, and/or provide program module, system, user, and/or data communications, requests, and/or responses.

Distributed Trust Certificate Management System

The structure and/or operation of any of the trust certificate management system node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the trust certificate management system controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principals. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principals of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for operating a trust certificate management system comprising a processor, the processor-implemented method comprising:
    monitoring, using the processor of the trust certificate management system, a trust to determine that a set of assets is contributed by a trust sponsor;
    creating, using the processor of the trust certificate management system, multiple base certificate classes representing portions of the set of assets held within the trust;
    managing, using the processor of the trust certificate management system, distributions from the trust to certificate holders in accordance with payment characteristics associated with the multiple base certificate classes held by the holders;
    receiving, at the trust certificate management system from a user device via a communications network, a request to exchange one or more certificates issued from the multiple base certificate classes into one or more certificates from a dynamic certificate class;
    determining, using the processor of the trust certificate management system, if a set of exchange requirements is satisfied including whether each certificate class comprises a principal amount equal to a fixed pro rata share of an underlying principal amount of the trust; and
    exchanging, when the set of exchange requirements is determined to be satisfied such that each certificate class includes the principal amount equal to the fixed pro rata share of the underlying principal amount of the trust, the one or more certificates issued from the multiple base certificate classes for the one or more certificates in the dynamic certificate class.

2. The processor-implemented method of claim 1, wherein the set of assets includes a pool of real property mortgages.

3. The processor-implemented method of claim 2, wherein the set of exchange requirements includes determining whether each class has payable interest of at least an aggregate interest on the pool of real property mortgages at a net mortgage rate.

4. The processor-implemented method of claim 3, further comprising:
    requesting a certificate rebalancing when the set of exchange requirements is determined to not be satisfied because each class does not have the payable interest of at least the aggregate interest on the pool of real property mortgages at the net mortgage rate.

5. The processor-implemented method of claim 1, wherein the trust certificate management system coordinates transferring a portion of contributed trust assets in exchange for the one or more certificates from the dynamic certificate class.

6. The processor-implemented method of claim 1, further comprising, upon determining that the set of exchange requirements is not satisfied, generating a request for certificate rebalancing.

7. The processor-implemented method of claim 1, wherein the dynamic certificate class includes a class of certificates associated with a floating interest rate, an inverse floating interest rate, or a fixed interest rate.

8. The processor-implemented method of claim 1, further comprising determining whether the dynamic certificate class is a floating certificate class.

9. The processor-implemented method of claim 1, further comprising, upon determining that additional assets are added to the trust, generating additional certificates in one or more of the multiple base certificate classes.

10. The processor-implemented method of claim 1, further comprising:
    requesting a certificate rebalancing when the set of exchange requirements is determined to not be satisfied because each certificate class does not comprise the principal amount equal to the fixed pro rata share of the underlying principal amount of the trust.

11. A trust certificate management system comprising:
    a processor;
    a memory, in communication with the processor, containing program instructions that when executed cause the processor to:
        create a base class of certificates that represents a portion of assets held within a trust;

determine when a set of exchange requirements is satisfied including whether the base class of certificates comprises a principal amount equal to a fixed pro rata share of an underlying principal amount of the trust;

facilitate, upon receiving a request, the exchange of one or more base class certificates for one or more dynamic class certificates when the base class of certificates includes the principal amount equal to the fixed pro rata share of the underlying principal amount of the trust; and transfer revenue generated by the one or more dynamic class certificates to a certificate holder in accordance with payment characteristics associated with the one or more dynamic class certificates held by the certificate holder.

12. The trust certificate management system of claim 11, wherein the trust certificate management system is configured to receive an indication that the certificate holder has contributed assets to the trust and to distribute one or more additional dynamic class certificates to the certificate holder.

13. The trust certificate management system of claim 11, wherein the one or more dynamic class certificates are created as a class of certificates associated with a floating interest rate, an inverse floating interest rate, or a fixed interest rate.

14. The trust certificate management system of claim 11, wherein the trust is structured as a grantor trust.

15. A system comprising:
a processor;
a memory, in communication with the processor, containing program instructions that when executed cause the processor to:
create multiple base certificate classes representing portions of a set of assets held within a trust;
manage distributions from the trust to certificate holders in accordance with payment characteristics associated with the multiple base certificate classes held by the certificate holders;
receive, from a user device, a request to exchange one or more certificates issued from the multiple base certificate classes into one or more certificates from a dynamic certificate class;
determine when a set of exchange requirements is satisfied including whether each certificate class comprises a principal amount equal to a fixed pro rata share of an underlying principal amount of the trust; and
exchange, when the set of exchange requirements is determined to be satisfied such that each certificate class includes the principal amount equal to the fixed pro rata share of the underlying principal amount of the trust, the one or more certificates issued from the multiple base certificate classes for the one or more certificates in the dynamic certificate class.

16. The system of claim 15, wherein the one or more certificates in the dynamic certificate class are created as a class of certificates associated with a floating interest rate, an inverse floating interest rate, or a fixed interest rate.

17. The system of claim 15, wherein the memory further contains program instructions that when executed cause the processor to monitor the trust to determine if the set of assets is contributed by a trust sponsor.

18. The system of claim 15, wherein the set of assets includes a pool of real property mortgages.

19. The system of claim 18, wherein the program instructions that when executed cause the processor to determine when the set of exchange requirements is satisfied include:
program instructions that when executed cause the processor to determine whether each class has payable interest of at least an aggregate interest on the pool of real property mortgages at a net mortgage rate.

20. The system of claim 15, wherein the memory further contains program instructions that when executed cause the processor to transfer a portion of contributed trust assets in exchange for the one or more certificates from the dynamic certificate class.

21. The system of claim 15, wherein the memory further contains program instructions that when executed cause the processor to generate a request for certificate rebalancing upon determining that the set of exchange requirements is not satisfied.

* * * * *